United States Patent
Pirner

(10) Patent No.: US 10,458,822 B2
(45) Date of Patent: Oct. 29, 2019

(54) DYNAMIC SPACER FOR A SMART PIPELINE INSPECTION GAUGE

(71) Applicant: Entegra LLP, Indianapolis, IN (US)

(72) Inventor: Paul Pirner, Mississauga (CA)

(73) Assignee: Entegra LLP, Indianapolis, IN (US)

( * ) Notice: Subject to any disclaimer, the term of this patent is extended or adjusted under 35 U.S.C. 154(b) by 174 days.

(21) Appl. No.: 15/646,351

(22) Filed: Jul. 11, 2017

(65) Prior Publication Data

US 2018/0010934 A1    Jan. 11, 2018

Related U.S. Application Data

(60) Provisional application No. 62/360,790, filed on Jul. 11, 2016.

(51) Int. Cl.
| | | |
|---|---|---|
| *G01D 11/30* | (2006.01) | |
| *F16L 55/00* | (2006.01) | |
| *F16L 55/26* | (2006.01) | |
| *F16L 101/30* | (2006.01) | |

(52) U.S. Cl.
CPC .............. *G01D 11/30* (2013.01); *F16L 55/00* (2013.01); *F16L 55/26* (2013.01); *F16L 2101/30* (2013.01)

(58) Field of Classification Search
CPC .......... G01D 11/30; F16L 55/00; F16L 55/26; F16L 2101/30
See application file for complete search history.

(56) References Cited

U.S. PATENT DOCUMENTS

| | | | |
|---|---|---|---|
| 3,949,292 A | 4/1976 | Beaver | |
| 4,769,598 A | 9/1988 | Krieg | |
| 4,945,306 A | 7/1990 | Lowther | |
| 4,964,059 A | 10/1990 | Sugaya | |
| 5,283,520 A | 2/1994 | Martin | |
| 5,293,117 A | 3/1994 | Hwang | |
| 5,309,844 A * | 5/1994 | Zollinger | F16L 55/30 104/138.2 |
| 5,506,505 A | 4/1996 | Worthen | |
| 5,565,633 A | 10/1996 | Wernicke | |
| 5,864,232 A | 1/1999 | Laursen | |

(Continued)

OTHER PUBLICATIONS

Adams et al., Full-Signature Multiple-Channel Vertilog, Society of Petroleum Engineers, May 1991, Anchorage, Alaska (10 pages).

*Primary Examiner* — David J Bolduc
(74) *Attorney, Agent, or Firm* — Maginot, Moore & Beck LLP

(57) ABSTRACT

An in-line inspection tool for a pipeline includes a body that is propelled through the pipeline and a plurality of sensor assemblies mounted to the body. The sensor assemblies are distributed circumferentially about a central axis of the body with each sensor assembly configured to move through a range of radial positions in a respective radial direction. A first sensor assembly of the plurality of sensor assemblies includes a first elongate arm, a first sensor carried by the first arm, and a first spacer that extends from the first arm. A second sensor assembly of the plurality of sensor assemblies includes a second elongate arm and a second sensor carried by the second arm. The first spacer contacts the second arm and maintains an expected circumferential spacing between the first arm and the second arm over the range of radial positions as the body is propelled through the pipeline.

19 Claims, 12 Drawing Sheets

(56) References Cited

U.S. PATENT DOCUMENTS

| | | | |
|---|---|---|---|
| 6,023,986 A | 2/2000 | Smith | |
| 6,640,655 B1 | 11/2003 | Manzak | |
| 6,683,452 B2 | 1/2004 | Lee | |
| 6,847,207 B1 | 1/2005 | Veach et al. | |
| 7,683,611 B2 * | 3/2010 | Burkhardt | G01N 27/82 324/220 |
| 7,798,023 B1 | 9/2010 | Hoyt et al. | |
| 8,020,460 B1 | 9/2011 | Hoyt | |
| 8,373,411 B2 | 2/2013 | Couchman | |
| 2006/0248966 A1 * | 11/2006 | Houldey | F16L 55/28 73/865.8 |
| 2007/0022830 A1 * | 2/2007 | Mandziuk | F16L 55/40 73/865.8 |
| 2008/0092672 A1 * | 4/2008 | Gibson | F16L 55/30 73/865.8 |
| 2011/0095752 A1 * | 4/2011 | Short | F16L 55/38 324/220 |
| 2012/0038354 A1 * | 2/2012 | Gies | G01N 27/82 324/240 |
| 2015/0346154 A1 * | 12/2015 | Huang | G01M 3/40 324/220 |
| 2016/0231279 A1 | 8/2016 | Hoyt | |
| 2016/0238184 A1 * | 8/2016 | Fielers | B08B 9/0551 |

* cited by examiner

DYNAMIC SPACER FOR A SMART PIPELINE INSPECTION GAUGE

CROSS-REFERENCE TO RELATED APPLICATIONS

This application claims the benefit of U.S. Provisional Patent Application No. 62/360,790, filed on Jul. 11, 2016, the disclosure of which is incorporated herein by reference in its entirety.

FIELD

This application relates to the field of pipeline inspection tools, and particularly to the stabilization of moveable sensor arrays in smart pipeline inspection gauges.

BACKGROUND

Pipeline systems are an integral component of global energy distribution. There are more than 2.6 million miles of energy pipelines in the United States alone, delivering trillions of cubic feet of natural gas and hundreds of billions of ton/miles of liquid petroleum products each year. To ensure the safety of these vast pipeline systems and often to comply with governmental regulations, pipeline operators must frequently service their pipelines and perform periodic inspections to assess pipeline integrity. Mechanical devices referred to as pipeline inspection gauges (or "pigs") are often employed to perform these maintenance and inspection functions inside the pipeline.

There are generally two types of pigs used to perform in-line maintenance operations: cleaning pigs and instrumented or smart pigs. Cleaning pigs are often purely mechanical devices that that clean the inside of the pipeline by performing various cleaning functions such as brushing, scraping, or polishing along the inside wall surfaces to remove debris as the pigs are pushed through the pipeline by the pressure of the product in the pipeline. Smart pigs are instrumented, electromechanical devices often referred to as in-line-inspection (ILI) tools that are used to inspect the pipeline for corrosion, metal loss, deformations, and the position of the pipeline. The different types of smart pigs are characterized by the different types of technologies implemented to perform their inspection functions. Ultrasonic transducing (UT) pigs use sound waves to measure the thickness of the wall of a steel pipe. A UT pig calculates the thickness of the wall based on the speed of sound in steel. Curvature detection pigs employ inertial navigation technology to measure the position and shape of the pipe.

Another type of smart pig is a magnetic flux leakage (MFL) detection pig. MFL pigs use powerful magnets to saturate the pipe wall with magnetism and then carry out a corrosion measurement function. Sensors between the poles of the magnets detect disturbances caused by metal loss due to corrosion or other mechanical damage. MFL pigs, like many smart pigs, are typically separated into sections or packages that house specific instrumentation or carry out specific functions. For instance, an MFL pig can include a drive package for propulsion, a sensor package for carrying out signal detection for corrosion measurements, a navigational package for determining relative or global position, and a power package for powering any on-board electronics. The packages are tethered to one another via flexible joints that allow the respective packages to pass individually through bends in the pipe.

FIG. 15 depicts a sensor package 400 of a prior art MFL pig. The sensor package 400 typically has sensors (not shown) affixed to or embedded in flexible arms 402 that touch the inside surface of a pipe as the pig moves axially along the pipe in the product flow direction. The flexible arms 402 are mounted on a body 404 of the MFL pig and circumferentially spaced about a central axis 12 defined by the body 404 so that the sensors detect magnetic flux leakage through an entire cross section of the pipe at one time. The arms 402 flex in a radial direction 16 generally perpendicular to the central axis 12 to accommodate reductions or other diametric anomalies in the pipe as the MFL pig is propelled through the pipe.

The algorithms used to process the magnetic flux leakage detected by the sensor depend on certain assumptions about the physical position of the sensors. Namely, the algorithms assume that the circumferential spacing between each pair of adjacent arms and, therefore, each pair of adjacent sensors is approximately equal for any given radial position of the arms within the pipeline. In practice, however, the dynamics of the MFL pig as it moves through the pipeline along with variances in pipeline diameter and debris existing in the pipeline cause variable spacing between the adjacent pairs of sensors on the MFL pig.

This variable spacing, in turn, makes data interpretation less reliable. For instance, assume that one sensor is affixed to each flexible arm of the MFL pig and the defect sizing algorithm assumes that the spacing between adjacent sensors for a given radial position of the arms based on the design of the MFL pig is 0.250 inches. If the actual spacing between two adjacent sensors is 0.320 inches because one arm is unexpectedly displaced from its intended neutral position, then the calculation of the size of the defect that is detected by these two adjacent sensors can be off by plus or minus 0.070 inches.

Accordingly, it would be advantageous to maintain the spacing between adjacent sensors in MFL pigs for any given radial position of the arms in order to improve the reliability of pipeline defect size estimations based on data acquired from such MFL pigs.

SUMMARY

An in-line inspection tool for a pipeline in one embodiment includes a body configured to be propelled through the pipeline, the body defining a central axis, and a plurality of sensor assemblies mounted to the body and distributed circumferentially about the central axis, each sensor assembly configured to move through a range of radial positions in a respective radial direction that is perpendicular to the central axis, a first sensor assembly of the plurality of sensor assemblies includes a first elongate arm, at least one first sensor carried by the first arm, and a first spacer that extends from the first arm, a second sensor assembly of the plurality of sensor assemblies includes a second elongate arm and at least one second sensor carried by the second arm, and contact between the first spacer and the second arm maintains an expected circumferential spacing between the first arm and the second arm over the range of radial positions An in-line inspection tool for a pipeline in another embodiment includes a body configured to be propelled through the pipeline, the body defining a central axis, and a plurality of sensor assemblies mounted to the body and distributed circumferentially about the central axis, each sensor assembly configured to move through a range of radial positions in a respective radial direction that is perpendicular to the central axis, a first sensor assembly of the plurality of sensor assemblies includes a first elongate arm, at least one first sensor carried by the first arm, and a first spacer with first symmetrical portions that extend from opposed lateral sides of the first arm, a second sensor assembly of the plurality of sensor assemblies includes a second elongate arm, at least one second sensor carried by the second arm, and a second spacer with second symmetrical portions that extend from opposed lateral sides of the second arm, and contact between the first spacer and the second spacer maintains an expected circumferential spacing between the first arm and the second arm over the range of radial positions.

A method for inspecting a pipeline with an in-line inspection tool includes selecting a plurality of sensor assemblies to be mounted on a body of the in-line inspection tool, each sensor assembly including an elongate arm, at least one sensor carried by the arm, and a spacer that extends from the arm, mounting the plurality of sensor assemblies on the body so that the sensor assemblies are distributed circumferentially about a central axis defined by the body, each sensor assembly configured to move through a range of radial positions in a respective radial direction that is perpendicular to the central axis, propelling the body through the pipeline with the sensor assemblies biased outwardly against an inner surface of the pipeline, and maintaining an expected circumferential spacing between adjacent arms over the range of radial positions via contact between the spacer of each sensor assembly and the arm of an adjacent sensor assembly.

The above described features and advantages, as well as others, will become more readily apparent to those of ordinary skill in the art by reference to the following detailed description and accompanying drawings. While it would be desirable to provide an in-line inspection tool that provides one or more of these or other advantageous features, the teachings disclosed herein extend to those embodiments which fall within the scope of the appended claims, regardless of whether they accomplish one or more of the above-mentioned advantages.

DETAILED DESCRIPTION

Figure 1:
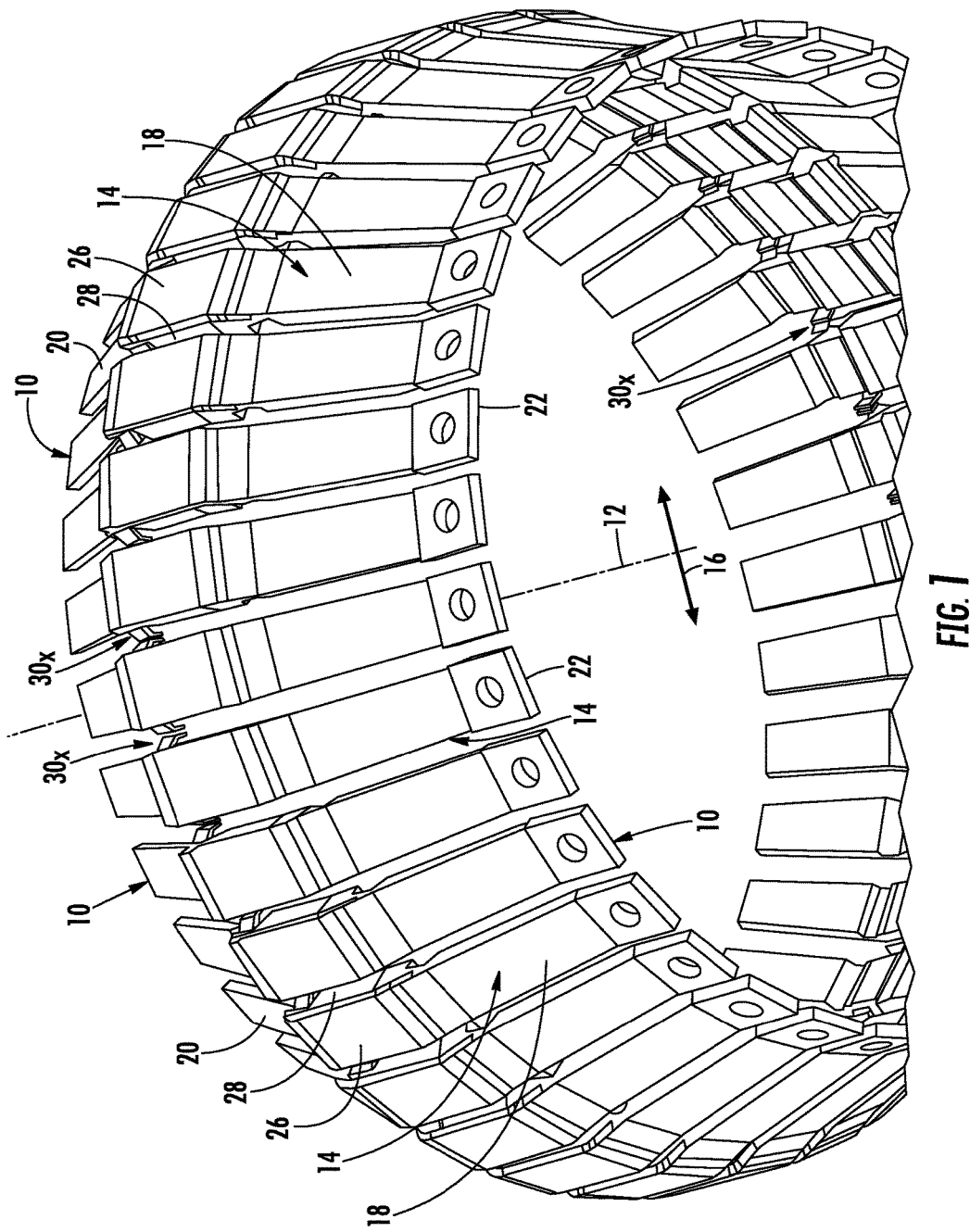
FIG. 1 shows a front perspective view of a plurality of circumferentially-spaced sensor assemblies on an in-line inspection tool for detecting a condition of a pipeline.
Figure 2:
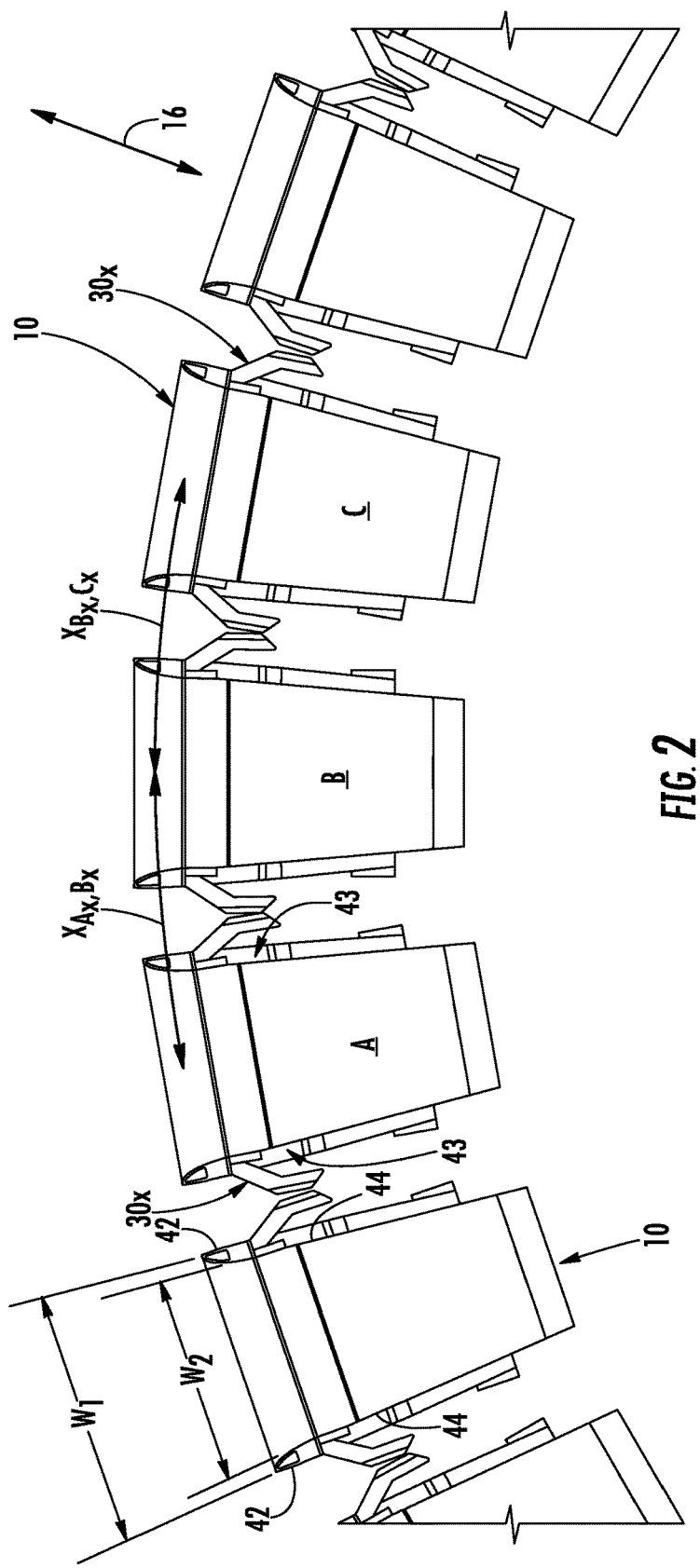
FIG. 2 shows a rear view of a portion of the circumferentially-spaced sensor assemblies of FIG. 1 with each sensor assembly including a first embodiment of a dynamic spacer that cooperates with adjacent dynamic spacers for maintaining an expected circumferential spacing between all of the sensor assemblies.

FIGS. 1 and 2 depict a plurality of circumferentially-spaced sensor assemblies 10 for detecting a condition of a pipeline. The sensor assemblies 10 in the embodiment shown in FIGS. 1 and 2 are configured to detect magnetic flux leakage (MFL) through a section of ferromagnetic pipe (not shown). In other embodiments, the sensor assemblies are configured to detect any attributes relating to a condition of a pipeline formed of any material. The sensor assemblies 10 are mounted on a pipeline inspection gauge referred to as an MFL pig (not shown). The MFL pig in the embodiment described is "free-swimming" in that it is configured to be driven axially through the pipeline by the force of the product moving therethrough. The MFL pig can be driven by virtually any product transported through the pipeline, such as natural gas, petroleum products, or sewage. In other embodiments, the MFL pig is "tethered" such that it is mechanically pulled through the pipeline by an external force that is not associated with the product transported through the pipeline. The sensor assemblies 10 are mounted to a body (not shown) in such a way that the sensor assemblies are circumferentially-spaced approximately about a central axis 12. The body of the MFL pig positions the central axis 12 of the sensor assemblies 10 approximately coaxial with a central axis of the pipeline (not shown).

Figure 3:
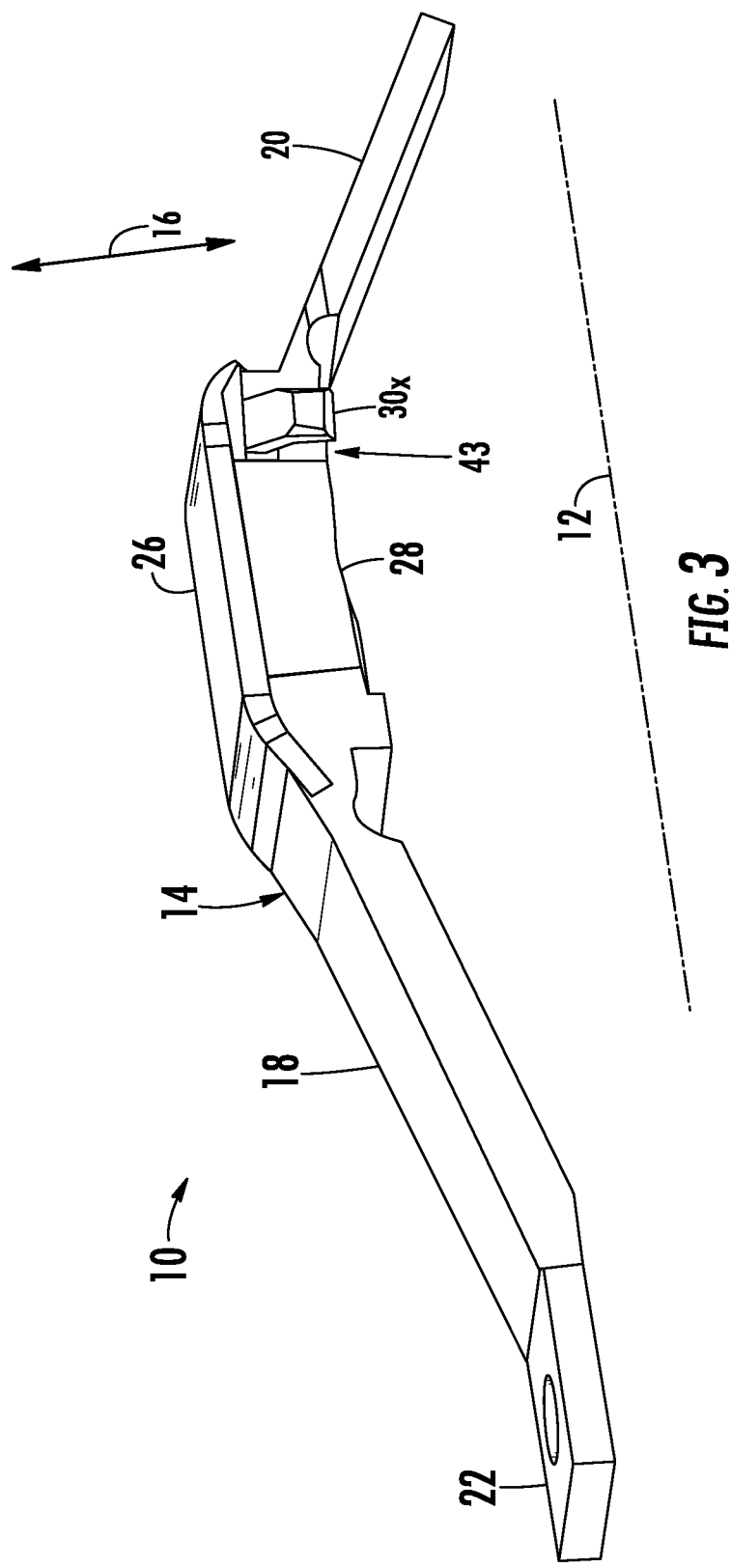
FIG. 3 shows a side perspective view of one sensor assembly of the plurality of circumferentially-spaced sensors assemblies of FIG. 1.

With particular reference to FIGS. 1-3, each sensor assembly 10 includes an arm 14 that is moveable in a radial direction 16 with respect to the central axis 12. The arm 14 is moveable in the radial direction 16 in any known manner such as by flexure of all or a portion of the arm 14, rotation of the arm 14 about a pivot, or parallelogram-like movement via one or more linkages. The arm 14 in the embodiment shown has a first body portion 18 that extends in a direction with a radial outward component and an axial rearward component and a second body portion 20 that extends from a rearward end of the first body portion 18 in a direction with a radial inward component and an axial rearward component. The second body portion 20 is optional in other embodiments. The first body portion 18 has a mounting flange 22 disposed at an axial foremost position along the first body portion 18. The optional second body portion 20 has a second mounting flange (not shown) disposed at a radial innermost position along the second body portion 20.

The first mounting flange 22 affixes the arm 14 to a body (not shown) of the MFL pig. The movement of the arms 14 in the radial direction 16 allows the sensor assemblies 10 to be squeezed through small diameter sections of the pipeline. The body is configured to provide the arms 14 with additional radial movement as needed to traverse sections of pipeline with varying diameters. The sensor assemblies 10 in the embodiment shown are affixed to the mounting portion of the MFL pig by a bolt or similar fastener. In other embodiments, the sensor assemblies 10 are affixed to the MFL pig in any known manner.

The sensor assemblies 10 each further include a wear plate 26 that forms a radial outside wear surface on the first body portion 18 of the arm 14 near an intersection of the first body portion 18 and the second body portion 20. The MFL pig radially positions the sensor assemblies 10 such that the respective wear plates 26 are biased radially outward and physically contact the inner surface of the pipeline as the MFL pig is driven or pulled therethrough. In the embodiment shown in the figures, the wear plates 26 are formed from metal and the arms 14 are formed from polyurethane, although in some embodiments the arms 14 are also formed from metal. In other embodiments, the wear plates 26 and the arms 14 are formed from any material that is appropriate for the working conditions of the MFL pig. The wear plate 26 in some embodiments is separately attached to the arm 14 while in other embodiments the wear plate 26 and the arm 14 are molded together.

The sensor assemblies 10 each further include a sensor head 28 housing one or more sensors. In the embodiment described, the one or more sensors are Hall Effect sensors configured to detect changes in magnetic flux. The sensors in other embodiments are any sensor that reliably detects attributes related to the condition of a pipeline formed of any material. The sensor head 28 is releasably attached to the arm 14 and positioned adjacent to and radially inward from the wear plate 26. The physical contact between the wear plate 26 and the pipeline as the MFL pig moves along the pipeline positions the sensor head 28 at a predetermined radial distance from the inner surface of the pipeline. In some embodiments, the sensor head 28 has fastening features (not shown) that cooperate with corresponding fastening features in the arm 14 such that the sensor head 28 snaps or locks into a precise position on the arm 14. In other embodiments, the sensor head 28 is mechanically fastened to the arm 14 by fasteners or adhesives.

Figure 4:
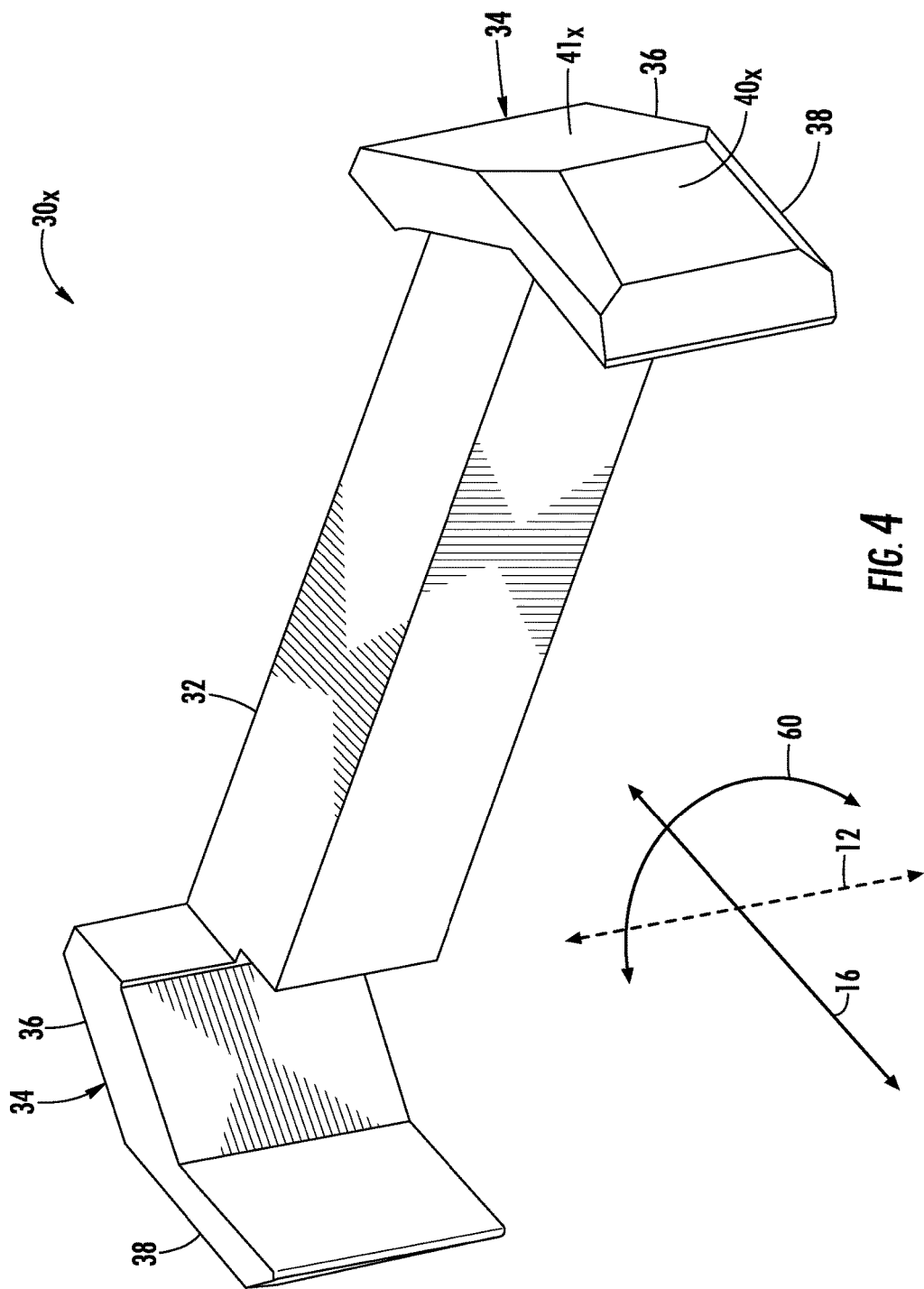
FIG. 4 shows an enlarged perspective view of the dynamic spacer of the sensor assembly of FIG. 3.

Referring now to FIGS. 1-4, each sensor assembly 10 further includes a dynamic spacer 30x affixed to or embedded in the arm 14. The dynamic spacer 30x of each sensor assembly 10 cooperates with the dynamic spacers 30x of adjacent sensor assemblies 10 to maintain approximately equal circumferential spacing $X_{Ax, Bx}$ and $X_{Bx, Cx}$ (FIG. 2) between all adjacent sensor assemblies 10 for any given radial position of the sensor assemblies 10. As best shown in FIG. 4, the dynamic spacer 30x includes an elongate body portion 32 and, in a first embodiment, a pair of symmetrical wing portions 34 disposed at each end of the elongate body portion 32. The elongate body portion 32 is sized and shaped to cooperate with the arm 14 for affixation thereto. In the embodiment shown in FIG. 4, the elongate body portion 32 has a rectangular cross section in a plane normal to the elongate extent of the body portion 32. The elongate body portion 32 in other embodiments can have any known cross sectional shape. The arm 14 in the embodiment shown in FIG. 3 defines a rectangular-shaped groove that accepts the elongate body portion 32. In other embodiments, the dynamic spacer 30x is formed as an integral feature of the arm 14.

The wing portions 34 each have a first wing portion 36 that extends away from the ends of the elongate body portion 32 and is angled radially inward. The wing portions 34 each further have a second wing portion 38 that extends from the first wing portion 36 in a radially inward direction. In another embodiment, the first wing portion 36 extends away from the elongate body portion 32 and is angled axially and the second wing portion 38 extends from the first wing portion 36 in an axial direction. In the case of an individual sensor assembly 10 that becomes radially offset from adjacent sensor assemblies 10, the dynamic spacers 30x are configured in a manner that does not lock or bind the offset individual sensor assembly 10 from returning to radial alignment with the adjacent sensor assemblies 10.

The first wing portion 36 defines a planar slide surface 41x that is configured to cooperate with adjacent dynamic spacers 30x associated with adjacent sensor assemblies 10 in certain positions of the sensor assemblies (such as those described with reference to FIGS. 10 and 11 below). The second wing portion 38 defines a planar contact surface 40x that cooperates with the respective planar contact surfaces 40x of adjacent dynamic spacers 30x associated with adjacent sensor assemblies 10. In some embodiments, the wing portions 34 are axially offset relative to the elongate body portion 32 and extend past the elongate body portion 32. In these embodiments, a portion of the respective first wing portions 36 is not directly connected to the elongate body portion such that a free space is formed between those unconnected portions. In further embodiments, the first wing portions 36 have a width that is greater than a width of the second wing portions 38. In yet further embodiments, the first wing portions 36 and the second wing portions 38 have bevels interposed between otherwise adjacent surfaces.

The material of the dynamic spacer 30x and the geometry of the wing portion 34 are such that each wing portion 34 is inwardly flexible towards the arm 14 in response to an input force on the planar contact surface 40x. The resilient nature of the material of the dynamic spacer 30x generates a reaction force that opposes the input force. As a result, the dynamic spacers 30x of adjacent sensor assemblies 10 cooperate with one another to maintain approximately equal circumferential spacing X therebetween.

Figure 5:
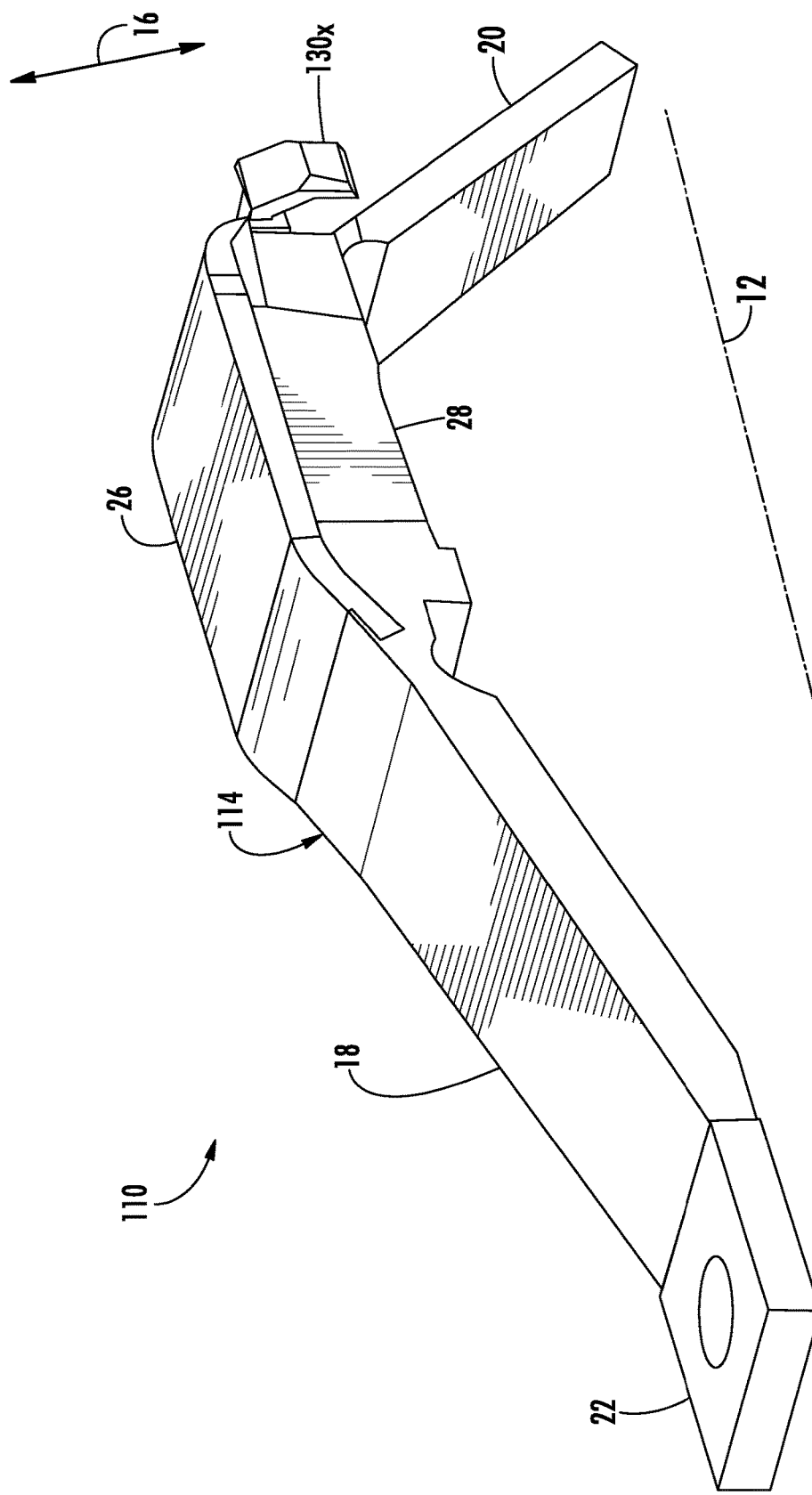
FIG. 5 shows the sensor assembly of FIG. 3 with the dynamic spacer disposed at an alternate position.

FIG. 5 depicts an alternative placement of a dynamic spacer 130x on an arm 114 of a sensor assembly 110. The arm 114 and the dynamic spacer 130x are similar to the arm 14 and the dynamic spacer 30x shown in FIGS. 1-4 except that the dynamic spacer 130x is positioned at a rearmost axial end of the first body portion 18 of the arm 114. In the embodiment shown in FIG. 5, the arm 114 defines a fastening structure (not shown) that cooperates with a corresponding body portion (not shown) of the dynamic spacer 130x to secure the dynamic spacer 130x to the arm 114. The positioning of the dynamic spacers 130x at the rearmost axial end of the arms 114 improves access to the dynamic spacers 130x and allows increased customization of the circumferential spacing between adjacent arms 114 for different applications. In other embodiments, the dynamic spacer 30x/130x is affixed to or embedded in the arm at any position along the arm relative to the central axis 12.

With reference again to the placement of the dynamic spacer 30x shown in FIG. 2, a main profile 42 of the arm 14 defines a first width $W_1$ across the arm 14. A portion 44 of the profile of the arm 14 proximate to the wing portions 34 of the dynamic spacer 30x is inwardly offset relative to the main profile 42 and defines a second width $W_2$ that is smaller than the first width $W_1$. The inwardly offset portion 44 of the arm 14 forms a clearance or recess 43 (see also FIG. 3) that enables the wing portions 34 to flex entirely within the main profile 42 of the arm 14 when the sensor assemblies 10 are positioned at maximum radial inward positions such as when the main profiles 42 of adjacent sensor assemblies are in contact with one another or nearly in contact with one another. The main profile 42 delimits opposed lateral sides of the sensor assemblies 10. In some embodiments the lateral sides form a V-shape when viewed parallel to the central axis 12. The V-shape enables the lateral sides of adjacent sensor assemblies 10 to be oriented essentially parallel to one another when the sensor assemblies are positioned at their respective maximum radial inward positions.

The interaction of the dynamic spacers $30x$ is now described with reference to FIGS. 6-11. The three sensor assemblies 10 identified in FIG. 2 as A, B, and C are shown in FIGS. 6-11 with the same designations. With specific reference to FIG. 6, the sensor assemblies 10 are configured to move in the radial direction 16 with respect to the central axis 12 (FIG. 1) of the body of MFL pig. The circumferential distribution of the sensor assemblies 10 about the central axis 12 permits each of the sensors assemblies 10 to move in a corresponding respective radial direction. For instance, Sensor Assembly A moves in respective radial direction $16_A$, Sensor Assembly B moves in respective radial direction $16_B$, and Sensor Assembly C moves in respective radial direction $16_C$. This freedom of motion accommodates changes in the pipeline being inspected. For example, features such as bends, constrictions, and changes in the thickness of the wall of the pipe may all affect the interior diameter of a pipeline. The radial movement of the sensor assemblies 10 permits the sensor heads 28 (FIG. 3) to closely track the interior surface of a pipeline despite changes in the interior diameter thereof by moving closer to one another or further away from one another as their circumferential spacing X changes.

Movement in the radial direction 16 changes the spacing X in the circumferential direction 60 between adjacent sensor assemblies 10. For example, as Sensor Assemblies A, B, and C move inwardly in respective radial directions $16_A$, $16_B$, and $16_C$, the circumferential spacing X between the adjacent sensor assemblies decreases. Conversely, as Sensor Assemblies A, B, and C move outward in respective radial directions $16_A$, $16_B$, and $16_C$, the circumferential spacing X between the adjacent sensor assemblies increases. As discussed above, the algorithms used to process the conditions detected by the sensor assemblies 10 assume an expected circumferential spacing between adjacent sensor assemblies that is the same for all adjacent sensor assemblies 10 distributed about the central axis 12. As used herein, "expected circumferential spacing" means the circumferential spacing between adjacent sensor assemblies that occurs if each sensor assembly moves without any deviation along its designed radial path. The dynamic spacer $30x$ of each sensor assembly 10 cooperates with adjacent dynamic spacers $30x$ and/or adjacent sensor assemblies to maintain the expected circumferential spacing therebetween over a range of radial positions of the sensor assemblies.

Figure 6:
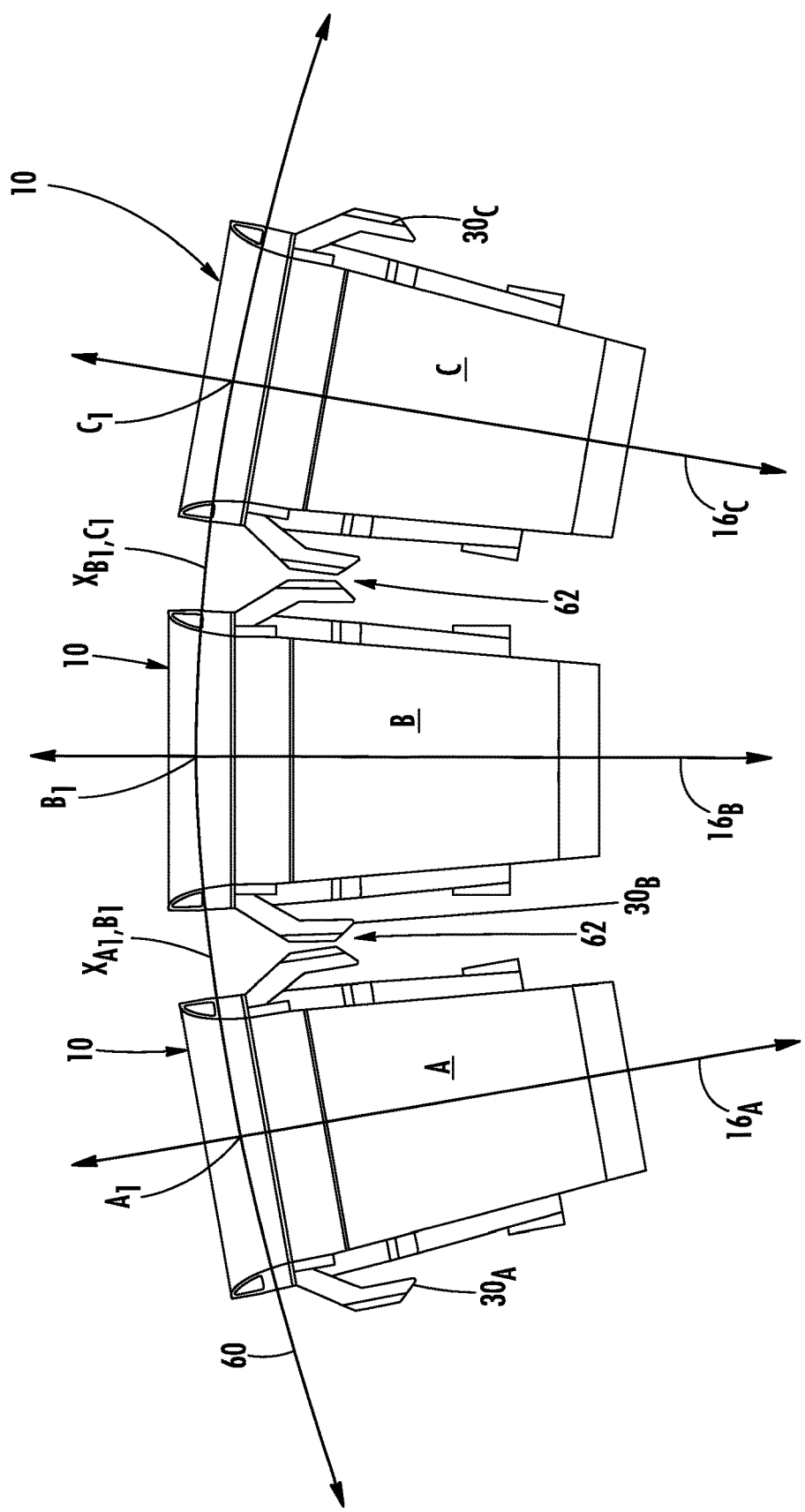
FIG. 6 shows three of the sensor assemblies of FIG. 2 overlaid with arrows indicating a circumferential direction and respective radial directions with the sensor assemblies positioned in respective first radial positions.

With reference to FIG. 6, the radial positions of Sensor Assemblies A, B, and C are positioned at a first radial position (A1, B1, and C1) that is the same for each sensor assembly. For clarity, an arbitrary reference point on each of Sensor Assemblies A, B, and C denotes the corresponding radial position of each of the sensor assemblies illustrated in FIGS. 6-11. In the first radial position depicted in FIG. 6, there is a small gap 62 between the dynamic spacers $30x$ of each of the sensor assemblies 10. In the embodiment shown, the gap 62 occurs only when the MFL pig is removed from the pipeline and the outwardly-biased sensor assemblies 10 move outwardly until a stop (not shown) prevents any further outward movement. In other embodiments, the first radial position occurs when the MFL pig is first installed in the pipeline and the sensor assemblies 10 are compressed by the inner surface of the pipeline. In these embodiments, the gap 62 is present until the inner diameter of the pipeline decreases by a predetermined amount and the sensor assemblies 10 are compressed further inwardly.

Figure 7:
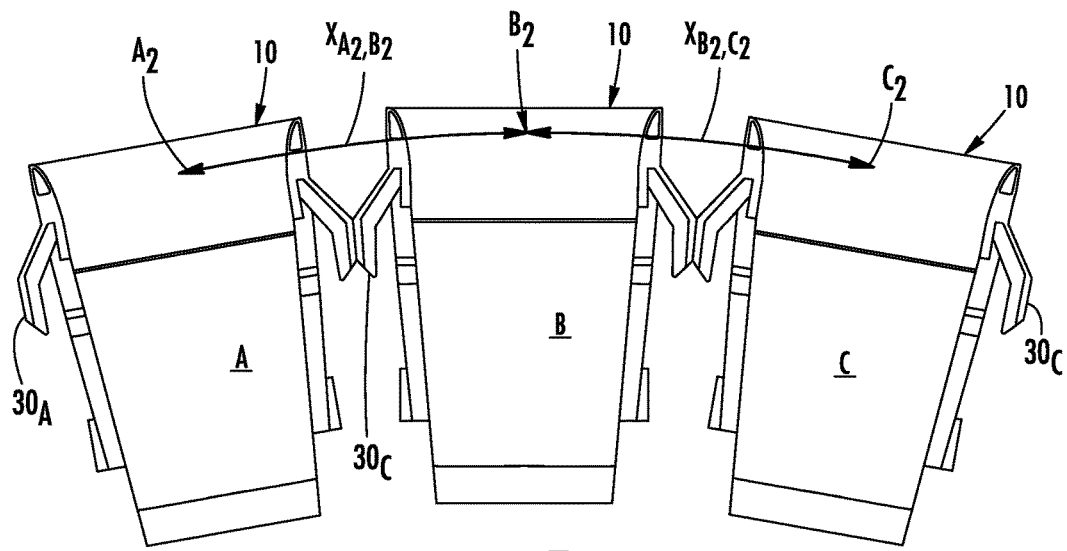
FIGS. 7-11 depict the three sensor assemblies of FIG. 6 in different radial positions to illustrate the interaction of the dynamic spacers.

The radial positions of Sensor Assemblies A, B, and C shown in FIG. 7 are positioned at a second radial position (A2, B2, and C2) that is the same for each sensor assembly. The second radial positions are radially inward from the first radial positions. In the second radial position depicted in FIG. 7, the dynamic spacers $30x$ of adjacent sensor assemblies 10 are in contact with one another such that there is no gap therebetween. Specifically, the right contact surface $40_A$ (as viewed in FIG. 2) of the dynamic spacer $30_A$ of Sensor Assembly A is in direct contact with the left contact surface $40_B$ of the dynamic spacer $30_B$ of Sensor Assembly B. Also, the left contact surface $40_C$ of the dynamic spacer $30_C$ of Sensor Assembly C is in direct contact with the right contact surface $40_B$ of the dynamic spacer $30_B$ of Sensor Assembly B.

The spacing $X_{A2, B2}$ between Sensor Assemblies A and B in the second radial position is less than the spacing $X_{A1, B1}$ (FIG. 6) of these sensor assemblies in the first radial position since the second radial positions are radially inward from the first radial positions. Similarly, the spacing $X_{B2, C2}$ between Sensor Assemblies B and C in the second radial position is less than the spacing $X_{B1, C1}$ (FIG. 6) of these sensor assemblies in the first radial position since the second radial positions are radially inward from the first radial positions.

Figure 8:
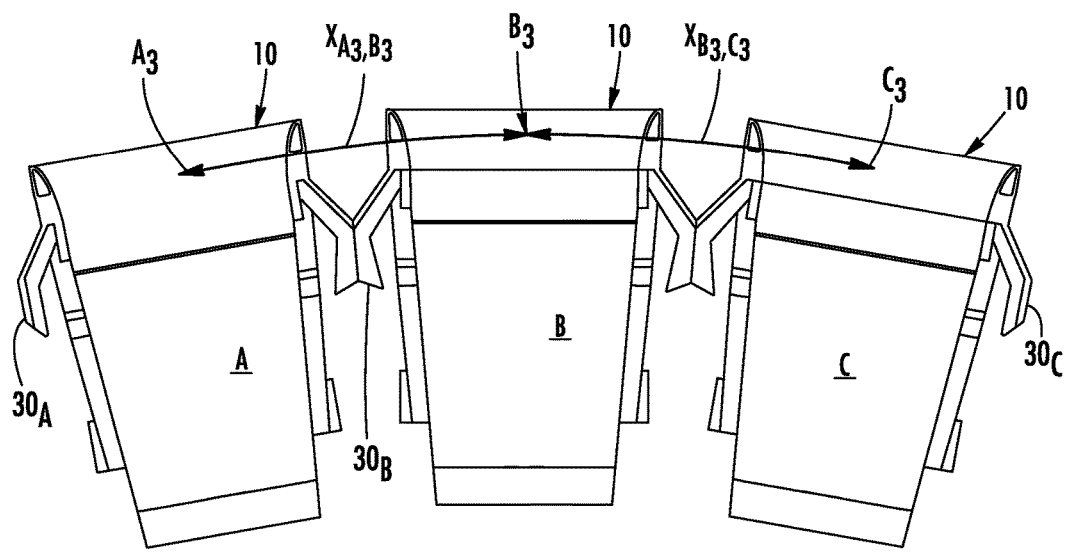

The radial positions of Sensor Assemblies A, B, and C shown in FIG. 8 are positioned at a third radial position (A3, B3, and C3) that is the same for each sensor assembly. The third radial positions are radially inward from the second radial positions. In the third radial position depicted in FIG. 8, the dynamic spacers $30x$ of adjacent sensor assemblies 10 remain in contact with one another at their respective contact surfaces $40x$ in a similar manner as described with reference to FIG. 7.

The spacing $X_{A3, B3}$ between Sensor Assemblies A and B in the third radial position is less than the spacing $X_{A2, B2}$ (FIG. 7) of these sensor assemblies in the second radial position since the third radial positions are radially inward from the second radial positions. Similarly, the spacing $X_{B3, C3}$ between Sensor Assemblies B and C in the third radial position is less than the spacing $X_{B2, C2}$ (FIG. 7) of these sensor assemblies in the second radial position since the third radial positions are radially inward from the second radial positions. The further reduced spacing between the sensors assemblies 10 in the third radial position causes the wing portions $34x$ (FIG. 4) of the dynamic spacers $30x$ to deflect inwardly toward their corresponding sensor assemblies 10.

During operation of the MFL pig with the sensor assemblies generally positioned in the second radial position, inertial forces due to the movement of the MFL pig, contact with debris, or non-uniform discontinuities along the pipeline can cause Sensor Assembly B, for example, to be urged in the circumferential direction 60 (FIG. 6) relative to Sensor Assemblies A and C. If Sensor Assembly B moves circumferentially towards sensor A and away from Sensor Assembly C, spacing $X_{A2, B2}$ becomes smaller than the expected circumferential spacing at that radial position and spacing $X_{B2, C2}$ becomes larger than the expected circumferential spacing at that radial position.

At the moment Sensor Assembly B is urged towards Sensor Assembly A, the left contact surface $40_B$ of the dynamic spacer $30_B$ of Sensor Assembly B applies a greater force on the right contact surface $40_A$ of the dynamic spacer $30_A$ of Sensor Assembly A. The resilient nature of the dynamic spacer $30_A$ of Sensor Assembly A causes an increase in the reaction force applied to the left contact surface $40_B$ of Sensor Assembly B and Sensor Assembly B is thereafter urged to remain in its nominal, design position and relative displacement is prevented. The dynamic spacer 30x of each sensor assembly 10 is positioned to contact adjacent dynamic spacers 30x or adjacent sensor assemblies 10 so as to prevent displacement of any one of the sensor assemblies 10 from its design position.

Figure 9:
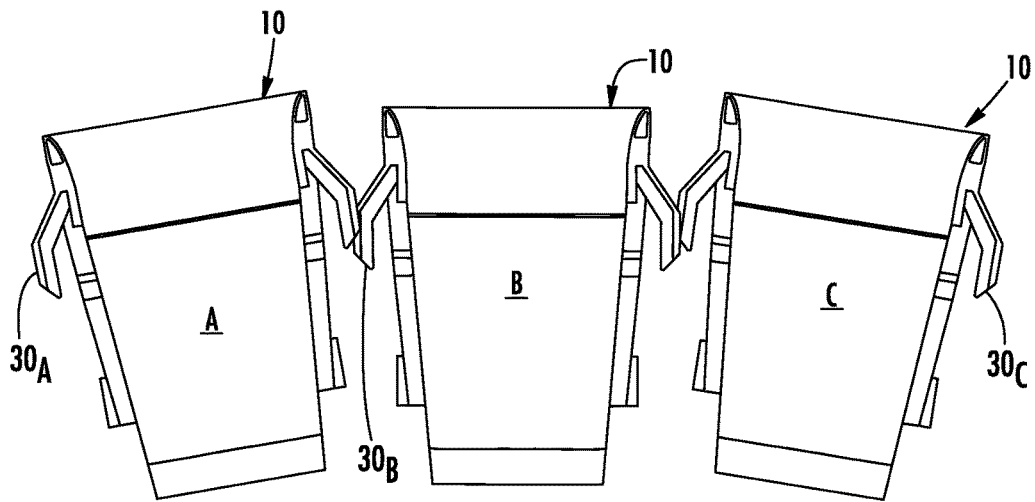
Figure 10:
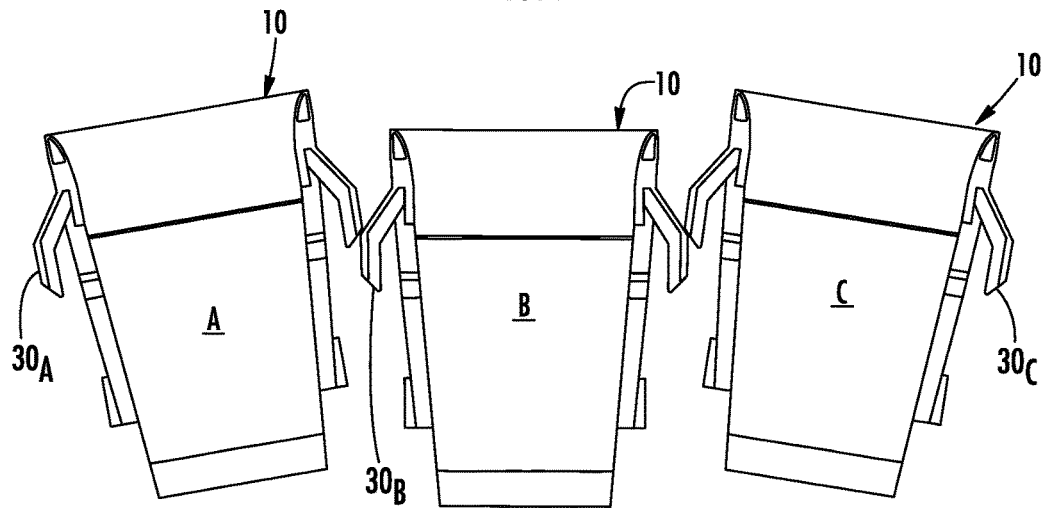
Figure 11:
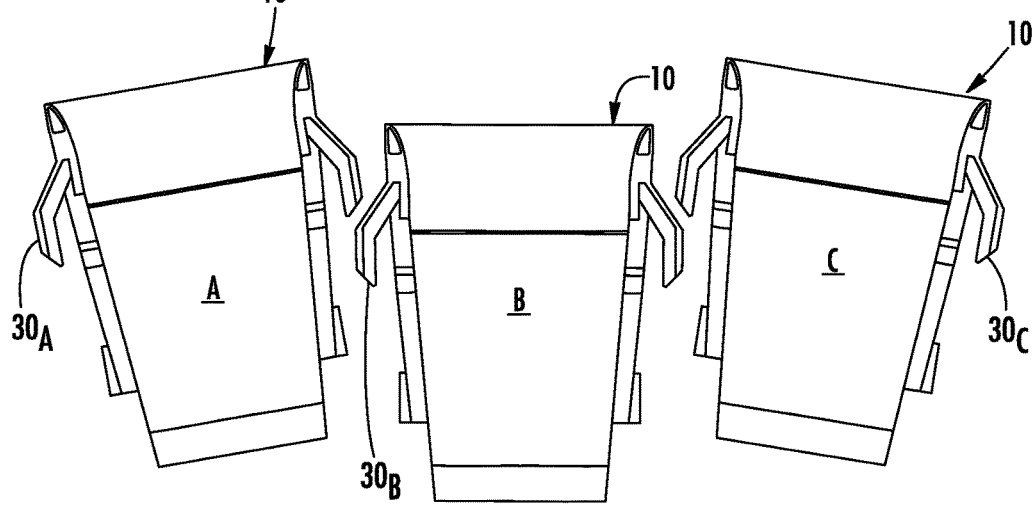

FIGS. 9-11 illustrate how the dynamic spacers 30x also reduce variation from the expected circumferential spacing between sensor assemblies 10 when a single sensor assembly deviates from the radial position of adjacent sensor assemblies. FIG. 9 shows Sensors Assemblies A and C at the second radial position while Sensor Assembly B is shown at a fourth radial position. The fourth radial position is radially inward from the second radial position. As shown in FIG. 9, a portion of the right contact surface $40_A$ (FIG. 4) of the dynamic spacer $30_A$ of Sensor Assembly A remains in contact with a portion of the left contact surface $40_B$ of the dynamic spacer $30_B$ of Sensor Assembly B. Similarly, a portion of the left contact surface $40_C$ of the dynamic spacer $30_C$ of Sensor Assembly C remains in contact with a portion of the right contact surface $40_B$ of the dynamic spacer $30_B$ of Sensor Assembly B. If Sensor Assembly B is urged in the circumferential direction 60 (FIG. 6) during operation of the MFL pig, the dynamic spacers 30x of the adjacent sensor assemblies 10 remain positioned to interact with Sensor Assembly B and urge it to remain in its design position and prevent any relative displacement thereof.

FIG. 10 shows Sensors Assemblies A and C at the second radial position while Sensor Assembly B is shown at a fifth radial position. The fifth radial position is radially inward from the fourth radial position. As shown in FIG. 10, the right second wing portion $38_A$ (FIG. 4) of the dynamic spacer $30_A$ of Sensor Assembly A contacts the slide surface $41_B$ of the left first wing portion $36_B$ of the dynamic spacer $30_B$ of Sensor Assembly B. Similarly, the left second wing portion $38_C$ (FIG. 4) of the dynamic spacer $30_C$ of Sensor Assembly C contacts the slide surface $41_B$ of the right first wing portion $36_B$ of the dynamic spacer $30_B$ of Sensor Assembly B. If Sensor Assembly B is urged in the circumferential direction 60 (FIG. 6) during operation of the MFL pig, the dynamic spacers 30x of the adjacent sensor assemblies 10 remain positioned to interact with Sensor Assembly B and urge it to remain in its design position and prevent any relative displacement thereof.

FIG. 11 shows Sensors Assemblies A and C at the second radial position while Sensor Assembly B is shown at a sixth radial position. The sixth radial position is radially inward from the fifth radial position. As shown in FIG. 11, the right second wing portion $38_A$ (FIG. 4) of the dynamic spacer $30_A$ of Sensor Assembly A no longer contacts the portion of the left first wing portion $36_B$ of the dynamic spacer $30_B$ of Sensor Assembly B. Similarly, the left second wing portion $38_C$ (FIG. 4) of the dynamic spacer $30_C$ of Sensor Assembly C no longer contacts the portion of the right first wing portion $36_B$ of the dynamic spacer $30_B$ of Sensor Assembly B. If Sensor Assembly B is urged in the circumferential direction 60 (FIG. 6) during operation of the MFL pig, the dynamic spacers 30x of the adjacent sensor assemblies 10 are no longer positioned to interact with Sensor Assembly B and urge it to remain in its design position and prevent any relative displacement thereof. In some embodiments, the second wing portions 38x of the dynamic spacer 30x extend further in the radially inward direction to enable the dynamic spacers 30x to reduce variation from the expected circumferential spacing for larger radial deviations of a single sensor assembly that deviates from the radial position of adjacent sensor assemblies.

The dynamic spacers 30x maintain equal spacing between the sensor assemblies 10 that more closely approximates the expected circumferential spacing between the sensor assemblies 10 at any given radial position. Ensuring proper spacing between the sensor assemblies improves the confidence in the quality of the prediction of the size of defects, particularly width defects, when implementing MFL pigs for such measurements.

Figure 12:
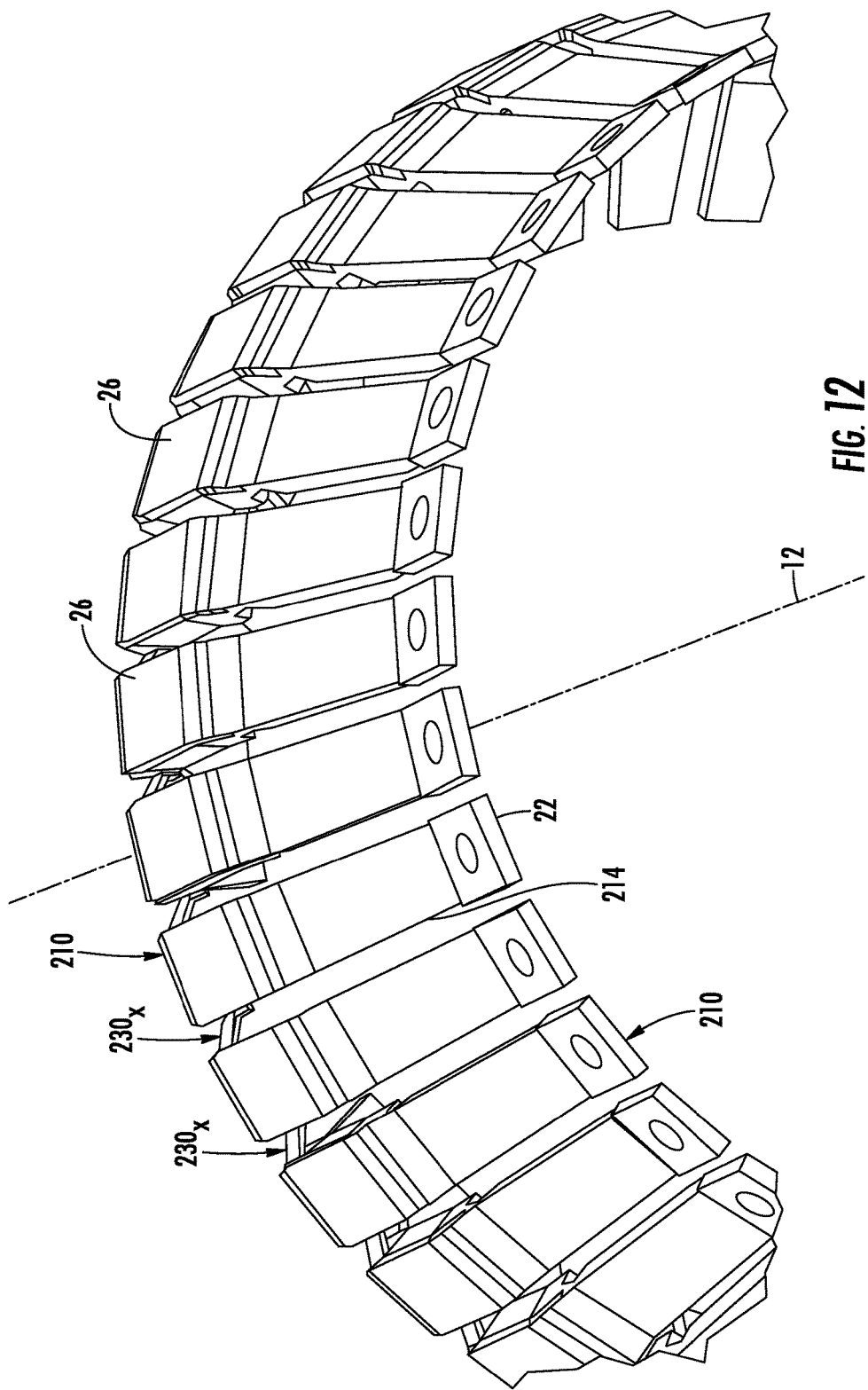
FIG. 12 shows a front perspective view of the plurality of circumferentially-spaced sensor assemblies of FIG. 1 with each sensor assembly including a second embodiment of the dynamic spacer.
Figure 13:
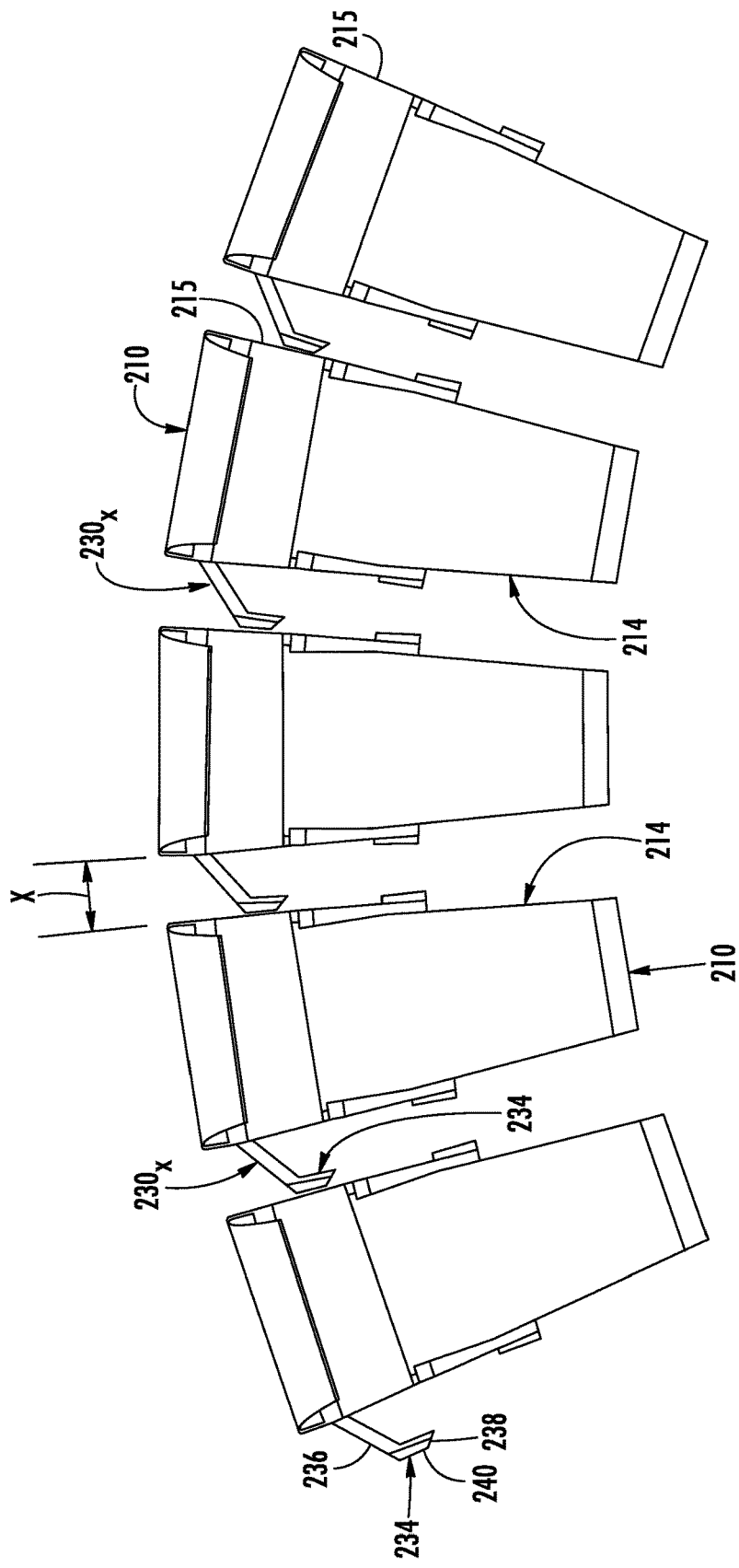
FIG. 13 shows a rear view of a portion of the circumferentially-spaced assemblies of FIG. 12.

With reference now to FIGS. 12 and 13, a second embodiment of a dynamic spacer 230x is shown affixed to or embedded in the respective arms 214 of the sensor assemblies 210. The dynamic spacer 230x of each sensor assembly 210 cooperates with a contact portion 215 of adjacent sensor assemblies 210 to maintain approximately equal circumferential spacing X (FIG. 13) between all adjacent sensor assemblies 210 for any given radial position of the sensor assemblies 210. The dynamic spacer 230x includes a body portion (not shown) and a wing portion 234 disposed at one end of the body portion. The body portion is sized and shaped to cooperate with the arm 214 for affixation thereto. The arm 214 in the embodiment shown defines a groove that accepts the body portion of the dynamic spacer 230x. In other embodiments, the dynamic spacer 230x is formed as an integral feature of the arm 214. The dynamic spacer 230x is affixed to or embedded in the arm at any position along the arm relative to the central axis 12.

The wing portion 234 of each dynamic spacer 230x has a first wing portion 236 that extends away from the end of the body portion with a circumferential outward component and a radial inward ward component. The wing portion 234 also has a second wing portion 238 that extends from the first wing portion 236 in a direction with a substantially radial inward component. In another embodiment, the first wing portion 236 extends away from the body portion with a circumferential outward component and an axial component and the second wing portion 238 extends from the first wing portion 236 with an axial component. In the case of an individual sensor assembly 210 that becomes radially offset from adjacent sensor assemblies 210, the dynamic spacers 230x are configured in a manner that does not lock or bind the offset individual sensor assembly 210 from returning to radial alignment with the adjacent sensor assemblies 210.

The second wing portion 238 defines a planar contact surface 240 that cooperates with the respective contact surfaces 215 of adjacent sensor assemblies 210. The material of the dynamic spacer 230x and the geometry of the wing portion 234 are such that the wing portion 234 is inwardly flexible towards the arm 214 in response to an input force on the planar contact surface 240. The resilient nature of the material of the dynamic spacer 230x generates a reaction force that opposes the input force. As a result, the dynamic spacers 230x of respective sensor assemblies 210 cooperate with the contact surfaces 215 of adjacent sensor assemblies 210 to maintain approximately equal circumferential spacing X therebetween.

Figure 14:
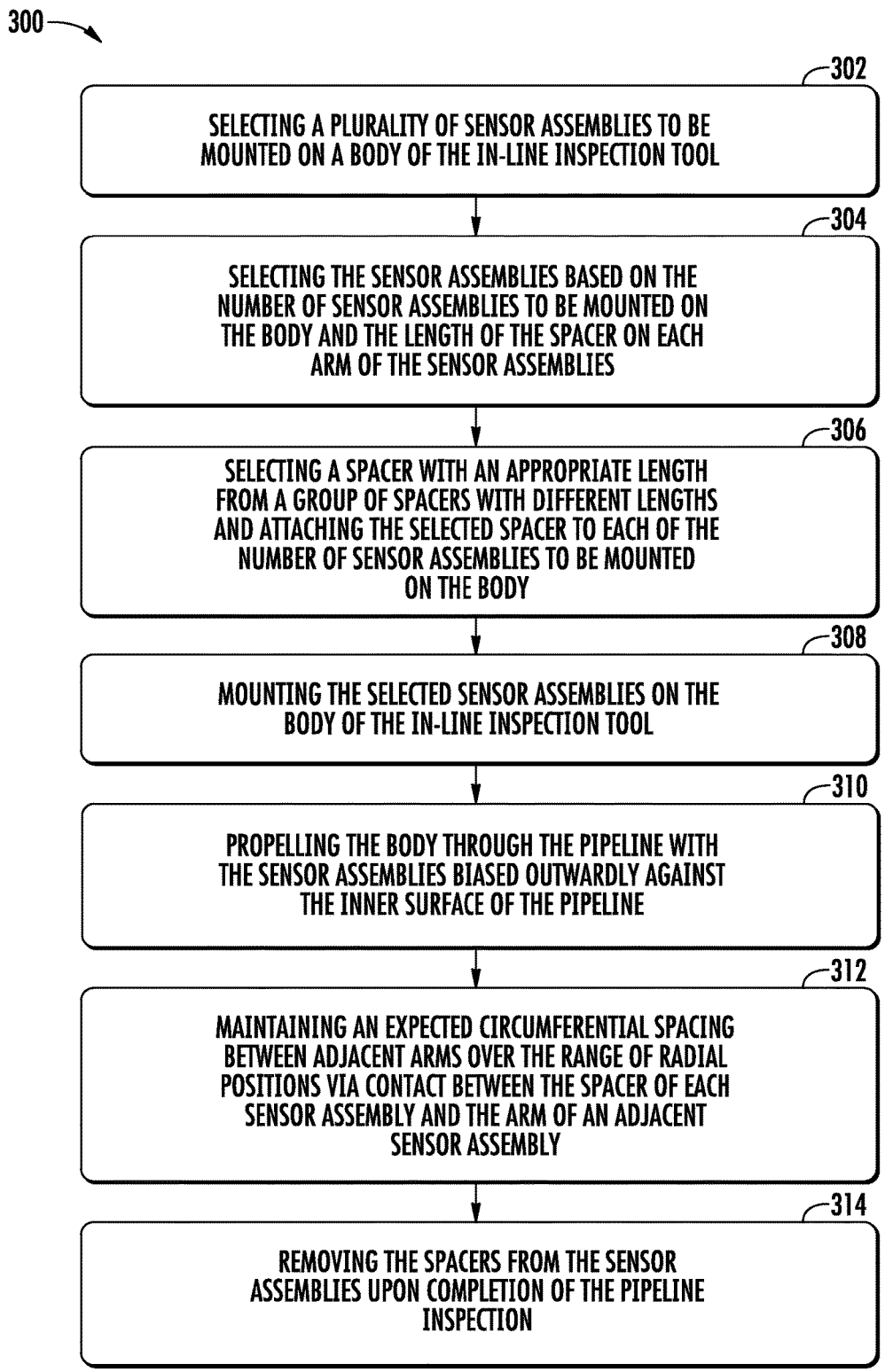
FIG. 14 shows a method for inspecting a pipeline with an in-line inspection tool.
Figure 15:
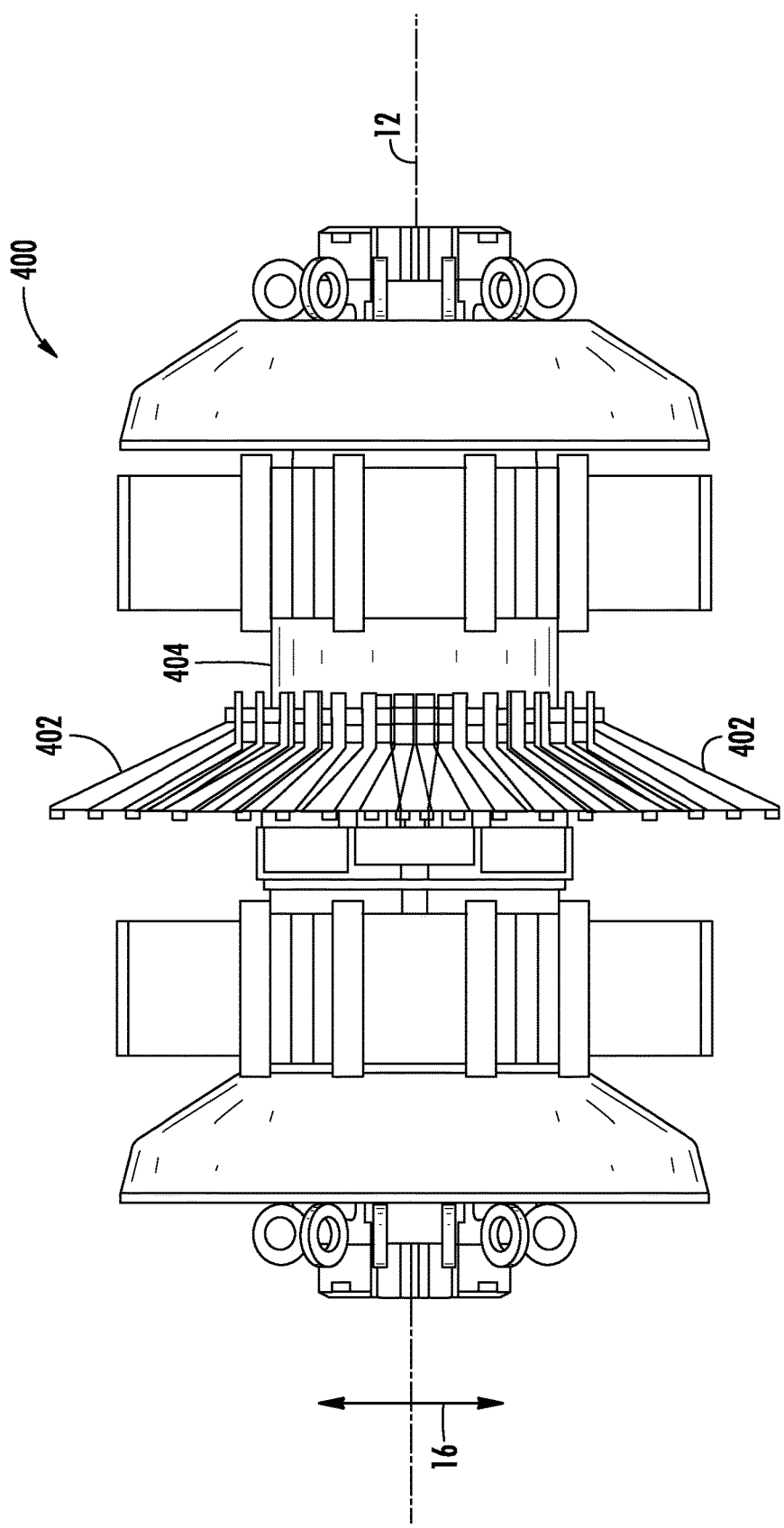
FIG. 15 shows a sensor package of a prior art in-line inspection tool configured to detect magnetic flux leakage (MFL) in a pipeline.

FIG. 14 illustrates a method 300 for inspecting a pipeline with an in-line inspection tool. The method is described in connection with the in-line inspection tool described with reference to FIGS. 1-13. The method includes selecting a plurality of sensor assemblies 10 to be mounted on a body (not shown) of the in-line inspection tool (block 302). The sensor assemblies each include an elongate arm 14, at least one sensor 28 carried by the arm 14, and a spacer 30x that extends from the arm 14. The sensor assemblies 10 are selected based on a number of considerations such as the nominal inner diameter of the inner surface of the pipeline to be inspected and the size of the body of the in-line inspection tool. The sensor assemblies 10 are also selected based on the number of sensor assemblies to be mounted on the body and the length of the spacer 30x on each arm 14 of the sensor assemblies 10 (block 304).

In some embodiments, selecting the sensor assemblies 10 includes selecting a spacer 30x with an appropriate length from a group of spacers 30x with different lengths and attaching that selected spacer 30x to each of the number of sensor assemblies 10 to be mounted on the body (block 306). As used herein, a spacer with "an appropriate length" is a spacer that, when mounted in association with each of the sensor assemblies on the body, interacts with adjacent sensor assemblies in the manner described above with reference to FIGS. 6-11.

The plurality of sensor assemblies 10 are then mounted on the body so that the sensor assemblies 10 are distributed circumferentially about a central axis 12 defined by the body (block 308). The mounted sensor assemblies 10 are configured to move through a range of radial positions in a respective radial direction that is perpendicular to the central axis 12. Once the sensor assemblies 10 are mounted to the body (block 308), the body is propelled through the pipeline with the sensor assemblies 10 biased outwardly against the inner surface of the pipeline (block 310). As the body is propelled through the pipeline, the spacer of each sensor assembly contacts the arm of an adjacent sensor assembly to maintain an expected circumferential spacing between the adjacent arms over the range of radial positions (block 312). In some embodiments, the spacers 30x are then removed from the sensor assemblies 10 upon completion of the pipeline inspection (block 314).

The foregoing detailed description of one or more embodiments of the in-line inspection tool has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An in-line inspection tool for a pipeline, comprising:
a body configured to be propelled through the pipeline, the body defining a central axis; and
a plurality of sensor assemblies mounted to the body and distributed circumferentially about the central axis, each sensor assembly configured to move through a range of radial positions in a respective radial direction that is perpendicular to the central axis,
wherein a first sensor assembly of the plurality of sensor assemblies includes a first elongate arm, at least one first sensor carried by the first arm, and a first spacer that extends from the first arm,
wherein a second sensor assembly of the plurality of sensor assemblies includes a second elongate arm and at least one second sensor carried by the second arm, and
wherein contact between the first spacer and the second arm results in application of a force to the second arm in a circumferential direction relative to the central axis and maintains an expected circumferential spacing between the first arm and the second arm over the range of radial positions.

2. The in-line inspection tool of claim 1, wherein the first spacer has a wing portion that extends from the first arm toward the second arm, the wing portion defining a first slide surface and a first contact surface that intersects the first slide surface, the first contact surface contacting the second arm to maintain the expected circumferential spacing.

3. The in-line inspection tool of claim 2, wherein the first slide surface of the first spacer extends from the first arm and is angled radially inward, and wherein the first contact surface of the first spacer extends radially inward.

4. The in-line inspection tool of claim 2, wherein:
the first arm and the second arm have a first condition in which the first arm and the second arm have a common first radial position in which the first spacer contacts the second arm with a first deflection of the first spacer,
the first arm and the second arm have a second condition in which the first arm has the first radial position and the second arm has a second radial position in which the first spacer contacts the second arm with a second deflection of the first spacer, and
wherein the second radial position is radially inward from the first radial position and the second deflection is greater than the first deflection.

5. The in-line inspection tool of claim 4, wherein:
the first arm and the second arm have a third condition in which the first arm has the first radial position and the second arm has a third radial position, the third radial position being radially inward from the second radial position such that the first spacer is radially outward from a second spacer on the second arm, and
the first contact surface of the first spacer is angled to facilitate the first arm and the second arm returning to the first condition or the second condition.

6. The in-line inspection tool of claim 1, wherein the first arm and the second arm have (i) a common first radial position in which the first spacer of the first arm is spaced from the second arm and (ii) a common second radial position in which the first spacer contacts the second arm, the second radial position radially inward from the first radial position.

7. The in-line inspection tool of claim 1, wherein the first arm and the second arm have (i) a common first radial position in which the first spacer of the first arm contacts the second arm without deflection of the first spacer and (ii) a common second radial position in which the first spacer contacts the second arm with deflection of the first spacer, the second radial position radially inward from the first radial position.

8. The in-line inspection tool of claim 1, wherein the first spacer is removable from the first arm.

9. An in-line inspection tool for a pipeline, comprising:
a plurality of sensor assemblies distributed circumferentially about a central axis, each sensor assembly of the plurality of sensor assemblies including an elongate arm, at least one sensor carried by the arm, and at least one spacer with a flexible wing that extends from a lateral side of the arm and contacts an adjacent sensor assembly,
wherein the flexible wing defines a slide surface that extends from the lateral side of the arm and a contact surface that intersects the slide surface, the contact surface configured to contact an adjacent spacer of the adjacent sensor assembly to maintain an expected circumferential spacing between the sensor assembly and the adjacent sensor assembly.

10. The in-line inspection tool of claim 9, wherein the slide surface of the spacer extends from the arm and is angled radially inward, and wherein the contact surface of the spacer extends radially inward.

11. The in-line inspection tool of claim 9, wherein the arm of the sensor assembly and an adjacent arm of the adjacent sensor assembly have (i) a common first radial position in which the spacer of the arm is spaced from the adjacent spacer of the adjacent arm and (ii) a common second radial position in which the spacer contacts the adjacent spacer, the second radial position radially inward from the first radial position.

12. The in-line inspection tool of claim 9, wherein the arm of the sensor assembly and an adjacent arm of the adjacent sensor assembly have (i) a common first radial position in which the spacer of the arm contacts the adjacent spacer of the adjacent arm without deflection of the spacer or the adjacent spacer and (ii) a common second radial position in which the spacer contacts the adjacent spacer with deflection of the spacer and the adjacent spacer, the second radial position radially inward from the first radial position.

13. The in-line inspection tool of claim 9, wherein:
the arm of the sensor assembly and an adjacent arm of the adjacent sensor assembly have a first condition in which the arm and the adjacent arm have a common first radial position in which the spacer contacts the adjacent spacer with a first deflection of the spacer and the adjacent spacer,
the arm and the adjacent arm have a second condition in which the arm has the first radial position and the adjacent arm has a second radial position in which the spacer contacts the adjacent spacer with a second deflection of the spacer and the adjacent spacer, and
wherein the second radial position is radially inward from the first radial position and the second deflection is greater than the first deflection.

14. The in-line inspection tool of claim 13, wherein:
the arm and the adjacent arm have a third condition in which the arm has the first radial position and the adjacent arm has a third radial position, the third radial position being radially inward from the second radial position, and
the slide surface of the adjacent spacer is angled such that the spacer slides past the adjacent spacer and allows the arm and the adjacent arm to return to the first condition or the second condition.

15. The in-line inspection tool of claim 9, wherein the flexible wing is symmetrical about a plane passing through the sensor assembly and extends from an opposed lateral side of the arm, the flexible wing contacting a further adjacent sensor assembly that faces the opposed lateral side.

16. A method for inspecting a pipeline with an in-line inspection tool, comprising:
propelling a plurality of sensor assemblies through the pipeline, the sensor assemblies distributed circumferentially about a body of the in-line inspection tool and configured to move radially with respect to a central axis defined by the body, each sensor assembly including an elongate arm, at least one sensor carried by the arm, and a spacer that extends from the arm, and
maintaining an expected circumferential spacing between the sensor assemblies via contact between the spacer of each sensor assembly and an adjacent sensor assembly, wherein said contact results in application of a circumferential force to the adjacent sensor assembly.

17. The method of claim 16, further comprising:
selecting the plurality of sensor assemblies to be distributed about the body; and
mounting the plurality of sensor assemblies on the body so that the sensor assemblies have the expected circumferential spacing before the sensor assemblies are propelled through the pipeline.

18. The method of claim 17, wherein the plurality of sensor assemblies is selected based on a number of sensor assemblies to be mounted on the body and a length of the spacer on each arm of the sensor assemblies.

19. The method of claim 17, wherein selecting the plurality of sensor assemblies to be distributed about the body includes:
determining a number of sensor assemblies to be mounted on the body,
selecting a spacer with an appropriate length from a group of spacers with different lengths, and
attaching the spacer with the appropriate length to each of the number of sensor assemblies to be mounted on the body.

* * * * *